US009921636B2

(12) United States Patent
Chung et al.

(10) Patent No.: US 9,921,636 B2
(45) Date of Patent: Mar. 20, 2018

(54) TERMINAL DEVICE FOR REDUCING POWER CONSUMPTION AND METHOD FOR CONTROLLING THE SAME

(71) Applicant: INDUSTRY-ACADEMIC COOPERATION FOUNDATION, YONSEI UNIVERSITY, Seoul (KR)

(72) Inventors: Jong-Moon Chung, Seoul (KR); Sung-Woong Jo, Seoul (KR); Tae Young Ha, Seoul (KR); Tae Hyun Kyong, Seoul (KR)

(73) Assignee: INDUSTRY-ACADEMIC FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/789,749

(22) Filed: Jul. 1, 2015

(65) Prior Publication Data
US 2016/0004289 A1    Jan. 7, 2016

(30) Foreign Application Priority Data
Jul. 2, 2014   (KR) .................. 10-2014-0082436

(51) Int. Cl.
 *G06F 1/32*  (2006.01)
 *G06F 9/48*  (2006.01)

(52) U.S. Cl.
 CPC ............. *G06F 1/324* (2013.01); *G06F 1/329* (2013.01); *G06F 9/4893* (2013.01); *Y02B 60/1217* (2013.01); *Y02B 60/144* (2013.01)

(58) Field of Classification Search
 CPC ....... G06F 1/324; G06F 1/329; H04L 1/1887; H04L 47/28; H04L 47/56; H04L 47/6215; H04L 47/6275; Y02B 60/1217
 See application file for complete search history.

(56) References Cited

U.S. PATENT DOCUMENTS 6,016,527 A  *  1/2000  DeMoss ............... G06F 13/372
                                                       710/107
6,834,354 B1 * 12/2004  Togawa ................ G06F 1/3203
                                                       713/320

(Continued)

FOREIGN PATENT DOCUMENTS

JP      H09-297688 A    11/1997
JP      2005-285093 A   10/2005

(Continued)

OTHER PUBLICATIONS

Lei Yang et al., "HAPPE: Human and Application-Driven Frequency Scaling for Processor Power Efficiency", IEEE Transactions on Mobile Computing, Aug. 2013, pp. 1546-1557, vol. 12, No. 8, IEEE.

(Continued)

*Primary Examiner* — Terrell S Johnson

(57) ABSTRACT

Disclosed are a terminal device and a method for controlling the terminal device that can reduce power consumption. The disclosed terminal device includes: a response time establisher unit which establishes a response time of an interactive application executed on the terminal device, with a frequency of a processor within the terminal device and a priority value of the interactive application as variables; a frequency determiner unit which determines the frequency of the processor based on a default priority value such that the response time does not exceed a preset response time threshold; a priority value determiner unit which determines the priority value based on the determined frequency such that the response time does not exceed the response time threshold; and an executor unit which runs the interactive application based on the determined frequency and the determined priority value.

9 Claims, 6 Drawing Sheets

(56) References Cited

U.S. PATENT DOCUMENTS

| | | | |
|---|---|---|---|
| 8,621,253 B1 | 12/2013 | Brown et al. | |
| 2005/0149940 A1* | 7/2005 | Calinescu | G06F 9/5061 |
| | | | 718/104 |
| 2005/0240707 A1* | 10/2005 | Hayashi | G06F 13/364 |
| | | | 710/309 |
| 2006/0282689 A1 | 12/2006 | Tipley | |
| 2010/0103872 A1* | 4/2010 | Park | H04L 45/24 |
| | | | 370/328 |
| 2014/0317326 A1* | 10/2014 | Miura | G06F 13/24 |
| | | | 710/260 |
| 2016/0116954 A1* | 4/2016 | Zhuang | G06F 1/26 |
| | | | 713/300 |

FOREIGN PATENT DOCUMENTS

| | | |
|---|---|---|
| JP | 2006-235907 A | 9/2006 |
| WO | WO 2011/158405 A1 | 12/2011 |

OTHER PUBLICATIONS

Sungju Huh et al., "Improving Interactivity via VT-CFS and Framework-assisted Task Characterization for Linux/Android Smartphones", 2012 IEEE International Conference on Embedded and Real-Time Computing Systems and Applications, 2012, pp. 250-259, IEEE.

Raymond C. Garcia et al., "Response Time Performance Estimation in Smartphones Applying Dynamic Voltage & Frequency Scaling and Completely Fair Scheduler", 2014 International Symposium on Consumer Electronics (ISCE), Jun. 2014, pp. 1-2, IEEE.

* cited by examiner

[FIG. 1]
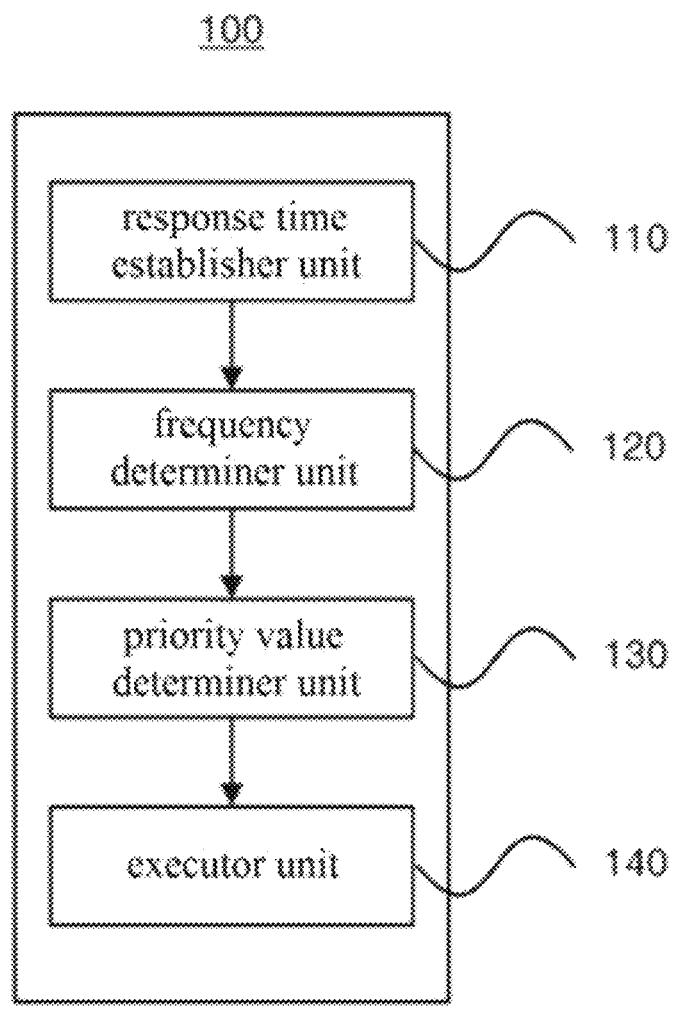

[FIG. 2]
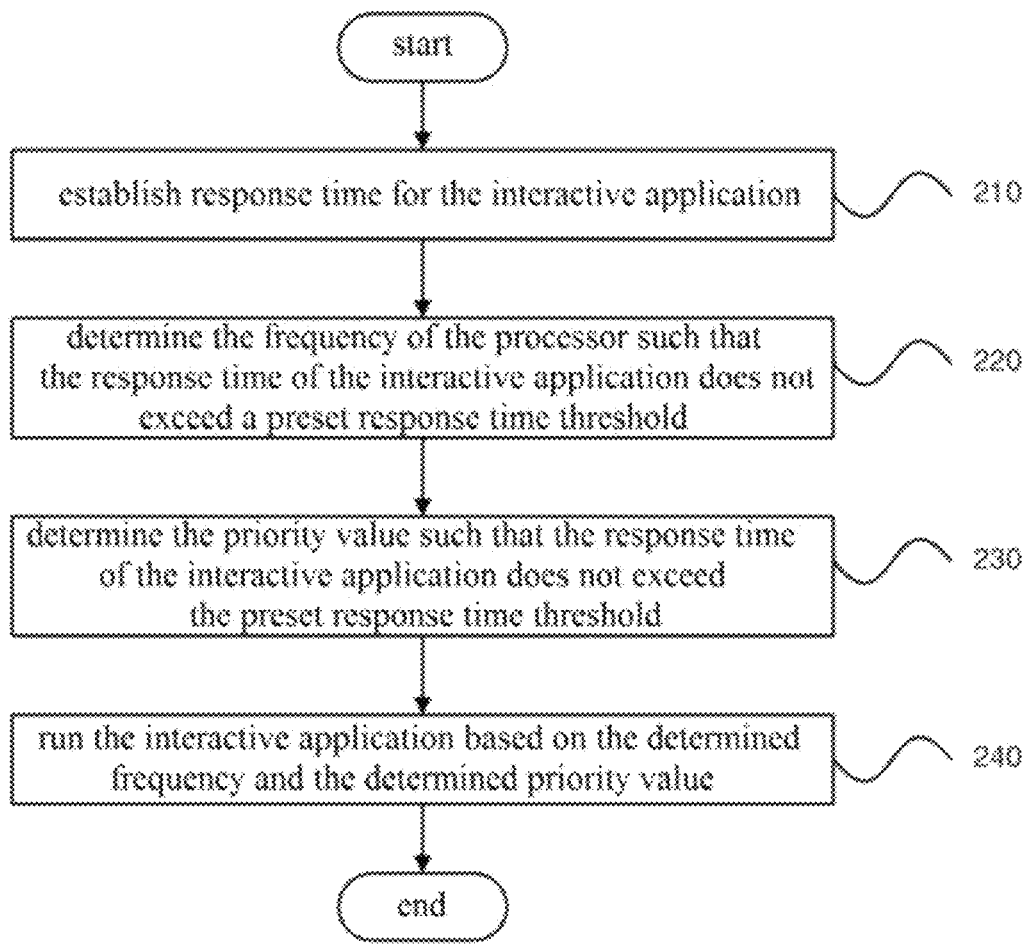

[FIG. 3]

| | RPP algorithm |
|---|---|
| 101 | GET $f$, $v(\tau_d)$, $T_s(\tau_d)$, $R_s(\tau_d)$, $U(\tau_l)$ |
| 102 | COMPUTE $f_{opt} = \max\{f \mid R_s(\tau_d) \leq R_{th}, v(\tau_d) = -20\}$ |
| 103 | if ($U_k = 0$) then |
| 104 | COMPUTE $v_{opt} = \max\{v(\tau_d) \mid R_s(\tau_d) \leq R_{th}, f = f_{opt}\}$ |
| 105 | end if |
| 106 | if ($f = f_{opt}$) then |
| 107 | SET $f = f_{opt}$ |
| 108 | end if |
| 109 | if ($v(\tau_d) = v_{opt}$) then |
| 1010 | SET $v(\tau_d) = v_{opt}$ |
| 1011 | end if |

[FIG. 4]
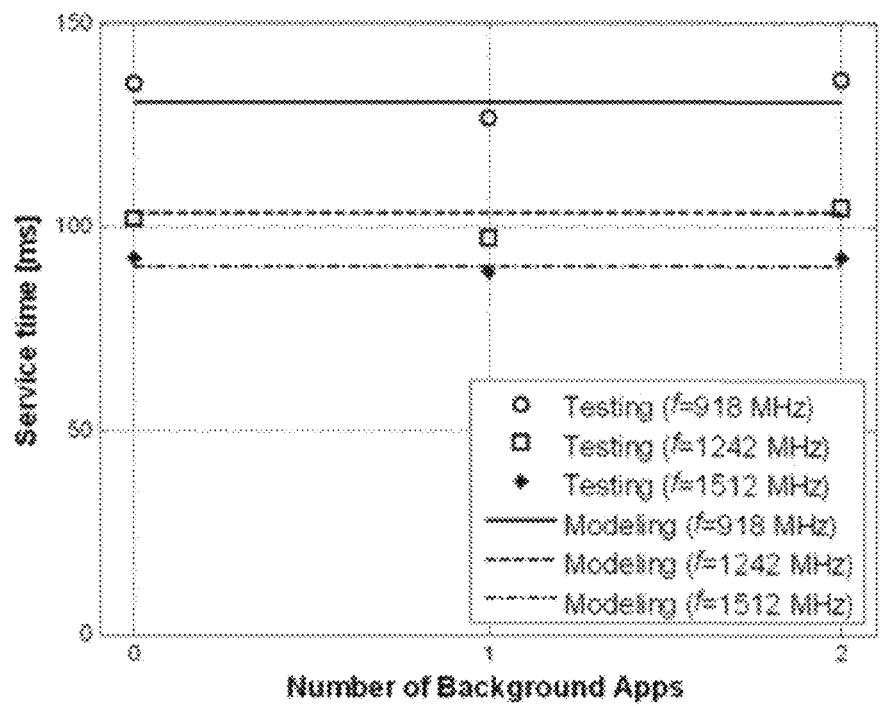
[FIG. 5]
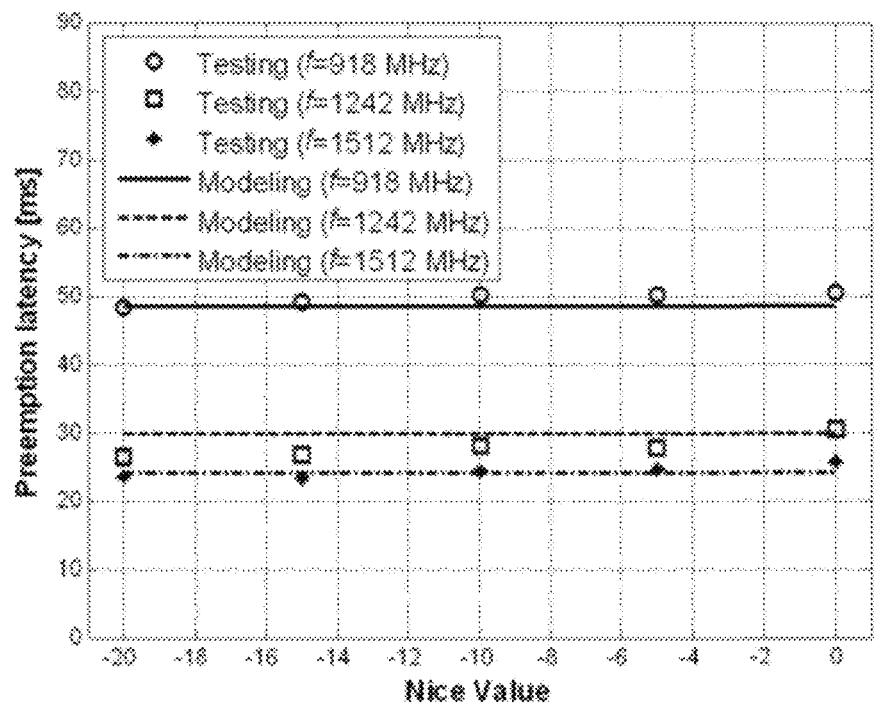

[FIG. 6]
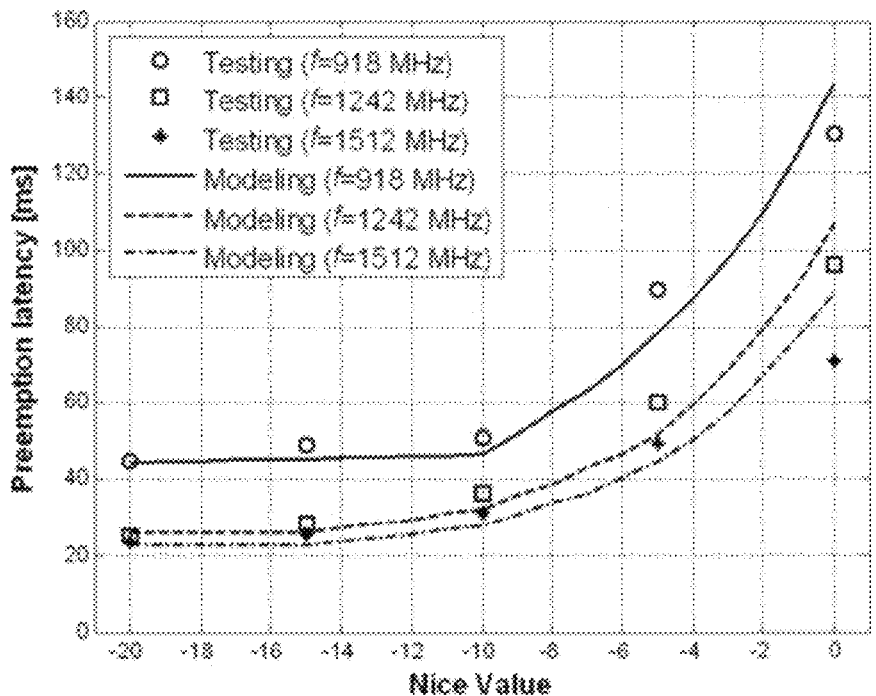
[FIG. 7]
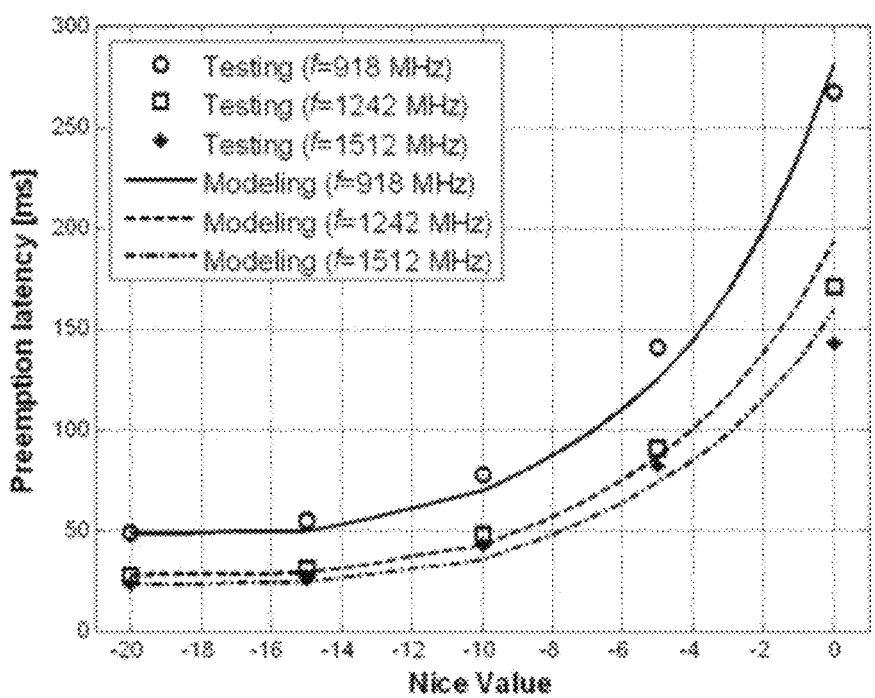

[FIG. 8]
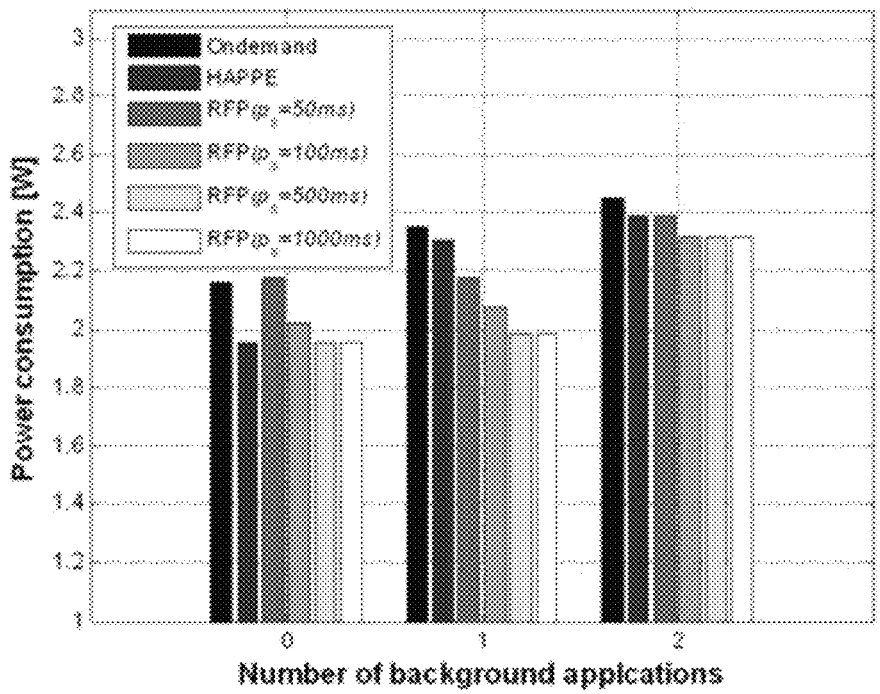
[FIG. 9]
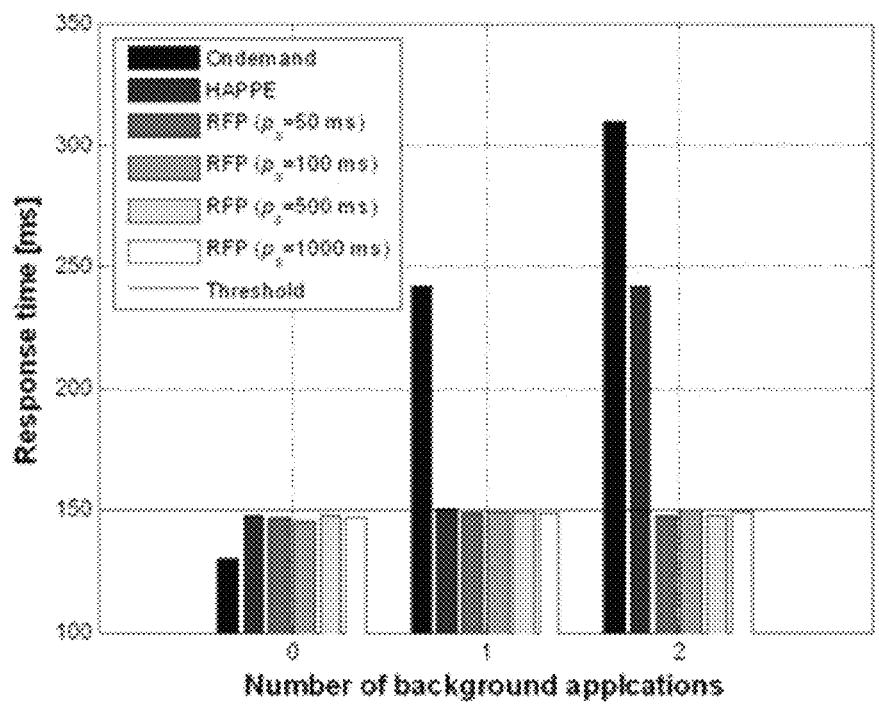

TERMINAL DEVICE FOR REDUCING POWER CONSUMPTION AND METHOD FOR CONTROLLING THE SAME

TECHNICAL FIELD

The embodiments of the invention relate to a terminal device and a method for controlling the same, more particularly to a terminal device and a method for controlling the terminal device that can reduce power consumption while preserving the user's satisfaction as regards response time for an interactive application running on the terminal device.

DESCRIPTION OF THE RELATED ART

An important goal of research in mobile terminal devices (mobile systems) such as smart phones and tablet PC's is to reduce power consumption while maintaining the performance of applications. As applications increase in complexity and fast processing (response time) is needed, so too is the performance of the supporting hardware, such as processors (CPU, GPU) and RAM, increasing.

Many of the applications executed on a terminal device such as a smart device are interactive applications and employ a user interface (UI). Examples of interactive applications include games, web browsing, image editors, and the like. In an interactive application, one of the most important factors is the response time. Here, the response time of an application refers to the duration between the user's input and the terminal device's reaction. While there may be slight differences between different users, the results of previous research indicate that a typical user feels discomfort when the response time exceeds 150 ms. Therefore, it is very important to meet such threshold value for response time.

Also, since smart devices provide multi-tasking functionality, an interactive application may be running simultaneously with several background applications. In such an environment, the interactive application may share a limited amount of processing resources with the background applications, making it more difficult to meet the response time threshold for the interactive application.

Meanwhile, with increases in hardware performance, the terminal device is consuming larger amounts of power, which leads to the problem of short battery life. As the result of related research efforts, DVFS (dynamic voltage and frequency scaling) is being widely used, which is a technique that can reduce power consumption by reducing the frequency and voltage of the processor.

More specifically, since a terminal device is not always required to process an application at maximum processing frequency, the DVFS technique can reduce power consumption by reducing the processing frequency. In an Android-based smart device, kernel modules called "Governors" serve to adjust the frequency of the processor.

The Performance Governor maintains the frequency of the processor at a maximum level, while the Powersave Governor maintains the frequency of the processor at a minimum level.

The Ondemand Governor raise the frequency of the processor to the maximum level if the load on the processor exceeds a predefined threshold, and lowers the frequency of the processor step by step as the load on the processor decreases. The Ondemand Governor is the governor set and operated as a default in many Android-based terminal devices.

The Interactive Governor operates similarly to the Ondemand Governor, but increases the frequency of the processor quickly for high loads of the processor and decreases the frequency of the processor slowly for low loads of the processor. Also, the Interactive Governor sets the adjustment of the processor to the highest priority, so that the power consumption efficiency is lower compared to the case of the Ondemand Governor but the response time is more improved.

The Conservative Governor also operates similarly to the Ondemand Governor, but increases the frequency of the processor slowly for high loads of the processor and decreases the frequency of the processor quickly for low loads of the processor. Therefore, the Conservative Governor provides higher power efficiency compared to the case of the Ondemand Governor but provides a slower response time.

In short, the DVFS technique can adjust the frequency of the processor based on the load of the processor but may also result in wasteful power consumption. This is because the processor frequency may be inefficiently increased when the background applications apply a high processor load. Moreover, failure to quickly increase the processor frequency when an interactive application is executed can result in a slow response time.

Much research is being carried out that aim to resolve such drawbacks of the DVFS technique. The Event-driven DVFS technique is a technique that differentiates the tasks of an interactive application from other tasks and increases the frequency of the processor only when the task of the interactive application is executed. Also, the TSB (time slice based) technique satisfies the performance requirements of running tasks by adjusting the frequency of a processor using the time slices of tasks. However, these techniques adjust the frequency of a processor using the properties of the applications and do not use the information on response times directly. Therefore, there may be occurrences when users feel dissatisfied by slow response times.

As a method of resolving users' dissatisfaction against response times, the PARTIC (power-aware response time control) technique adjusts the frequency of a processor by using the response time information of a running application. Here, the response time is measured periodically by checking the user's history of Internet service use. However, if the numerous applications running on a smart device do not use Internet services, the PARTIC technique cannot be applied.

Also, the HAPPE (human and application driven frequency scaling for processor power efficiency) technique adjusts the frequency of the processor according to each application and user. For this, the HAPPE technique requires a frequency profile for each user and application. Also, with HAPPE, the user has to provide manual input based on the user's experiences. For example, the user may increase the frequency of the processor by pressing the performance key for a fast response time and may decrease the frequency of the processor by pressing the power key for reduced power consumption.

There has also been much research conducted for analyzing the influence of the scheduler on response time.

The CFS (completely fair scheduler) is a scheduler used in an Android-based smart device. The goal of the CFS is to maintain fairness in proportion to the weights of the tasks. For the CFS scheduler, the weight of each task is determined by a Nice value, which corresponds to a priority value. A low Nice value is proportional to a high priority value, where the Nice value may be an integer between [−20, 19]. Each time the Nice value of a task is decreased by 1, the weight of the corresponding task is increased by 1.25 times. In an Android-based smart device, the CFS assigns a Nice value of 0 to all executed applications as default. The CFS operates in a round-robin sequence, allotting resources to the tasks in proportion to the Nice values within a particular period. The CFS is also a virtual runtime scheduler. Using a red-black tree, the tasks are aligned from the left to right of the tree in ascending order of virtual runtime. The CFS processes the tasks beginning from the left of the red-black tree.

Also, the VT-CFS (virtual runtime-based CFS) is a technology that improves response time by increasing the priority of interactive tasks but does not consider the amounts of power consumption during the processing of the tasks.

All of the research efforts described above adopt a DVFS and a scheduler for improving power consumption or response time, but none of these can improve both power consumption and response time simultaneously.

DISCLOSURE

Technical Problem

To resolve the problems in the related art described above, an aspect of the invention proposes a terminal device and a method for controlling the terminal device that can reduce power consumption while preserving the user's satisfaction as regards the response time in an interactive application running on the terminal device.

Other objectives of the invention can be derived by the skilled person from the embodiments set forth below.

Technical Solution

To achieve the objective above, an embodiment of the invention provides a terminal device that includes: a response time establisher unit which establishes a response time of an interactive application executed on the terminal device, with a frequency of a processor within the terminal device and a priority value of the interactive application as variables; a frequency determiner unit which determines the frequency of the processor based on a default priority value such that the response time does not exceed a preset response time threshold; a priority value determiner unit which determines the priority value based on the determined frequency such that the response time does not exceed the response time threshold; and an executor unit which runs the interactive application based on the determined frequency and the determined priority value.

Also, another embodiment of the invention provides a method for controlling a terminal device that includes: establishing a response time of an interactive application executed on the terminal device with a frequency of a processor within the terminal device and a priority value of the interactive application as variables; determining the frequency of the processor based on a default priority value such that the response time does not exceed a preset response time threshold; determining the priority value based on the determined frequency such that the response time does not exceed the response time threshold; and running the interactive application based on the determined frequency and the determined priority value.

Advantageous Effects

An embodiment of the invention can provide the advantage of reducing power consumption while preserving the user's satisfaction as regards the response time in interactive applications executed on the terminal device.

BRIEF DESCRIPTION OF THE DRAWINGS

FIG. 1 schematically illustrates the overall composition of a terminal device according to an embodiment of the invention.

FIG. 2 illustrates a method for controlling a terminal device according to an embodiment of the invention.

FIG. 3 illustrates pseudocode for a method of controlling a terminal device 100 according to an embodiment of the invention.

FIG. 4 illustrates the results of comparing the validity of the service time obtained according to an embodiment of the invention with tested values.

FIG. 5 through FIG. 7 illustrate the results of comparing the validity of the preemption delay time obtained according to an embodiment of the invention with tested values.

FIG. 8 and FIG. 9 compare the response time of an interactive application and the amount of power consumption when a smart device is controlled by the Ondemand Governor, HAPPE, and a control method according to an embodiment of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention are described below in more detail with reference to the accompanying drawings.

FIG. 1 schematically illustrates the overall composition of a terminal device according to an embodiment of the invention.

Referring to FIG. 1, a terminal device 100 according to an embodiment of the invention may include a response time establisher unit 110, a frequency determiner unit 120, a priority value determiner unit 130, and an executor unit 140.

FIG. 2 illustrates a method for controlling a terminal device according to an embodiment of the invention.

The role of each element of the terminal device 100 and the procedure performed for each step are described below in more detail with reference to FIG. 1 and FIG. 2.

In step 210, the response time establisher unit 110 may establish a response time (response time model) for an interactive application. As described above, the response time of an interactive application refers to the duration between the user's input and the terminal device's reaction.

Here, the response time of the interactive application can be composed of a service time, a preemption delay time, a scheduling delay (scheduling latency) time, and a waiting time, and this can be expressed as Formula 1 shown below.

$$R_t(\tau_A) = T_s(\tau_A) + L_p(\tau_A) + L_s(\tau_A) + T_w(\tau_A) \quad \text{[Formula 1]}$$

Here, $R_t(\tau_A)$ represents the response time, $T_s(\tau_A)$ represents the service time, $L_p(\tau_A)$ represents the preemption delay time, $L_s(\tau_A)$ represents the scheduling delay time, and $T_w(\tau_A)$ represents the waiting delay time. The The respective times are described below in more detail.

First, the service time represents the time during which the interactive application receives service from the processor. Here, the service time may be a function of the frequency of the processor.

According to an embodiment of the invention, the service time ($T_s(\tau_A)$) can be expressed by Formula 2 shown below.

$$T_s(\tau_A) = \frac{\alpha(\tau_A)}{f} + \beta(\tau_A) \quad \text{[Formula 2]}$$

Here, f represents the frequency of the processor, $\alpha(\tau_A)$ represents a first processing amount of the tasks ($\tau_A$) of the interactive application that is influenced by the frequency of the processor, and $\beta(\tau_A)$ represents a second processing amount of tasks of the interactive application that is not influenced by the frequency of the processor.

Next, the preemption delay time refers to the time during which the resources of the processor are occupied (interrupted) by another task while a task of the interactive application is allotted with a required service time by the processor from the beginning to the end of its running. Here, the preemption delay time may be a function of the frequency of the processor and the priority value of the interactive application. Also, as described above, the priority value may correspond to a Nice value of the interactive application, where a low Nice value is proportional to a high priority value, and the Nice value is an integer between [−20, 19].

Also, the preemption delay time may include a first preemption delay time, which occurs due to the tasks of other applications (background applications), and a second preemption delay time, which occurs due to tasks required for maintaining the system of the terminal device 100.

According to an embodiment of the invention, the preemption delay time ($L_p(\tau_A)$) can be expressed by Formula 3 shown below.

$$L_p(\tau_A) = L_p^1(\tau_A) + L_p^2(\tau_A) \quad \text{[Formula 3]}$$

$$L_p^1(\tau_A) = \frac{T_s(\tau_A)R_C(\tau_A)\max\left[1 - R_s(\tau_A)\frac{W(\tau_A)}{W_0}\overline{U}_b, 0\right]}{S_t(\tau_A)} \sum_{\forall \tau_i \in S_{back}} S_t(\tau_i)$$

$$L_p^2(\tau_A) = T_s(\tau_A)\frac{\hat{U}_s}{U(\tau_A)/100}$$

Here, $L_p^1(\tau_A)$ represents the first preemption delay time, $L_p^2(\tau_A)$ represents the second preemption delay time, $R_c(\tau_A)$ represents a competition rate, which is the rate of competition with other tasks during processing for a task of the interactive application by the processor, $R_s(\tau_A)$ represents a sleep rate, which is the rate by which the state of a task of the interactive application in a kernel is a sleep state, $W_0$ represents the weight for a Nice value corresponding to a reference priority value (i.e. the weight for a task having a Nice value of 0), $W(\tau_A)$ represents the weight for a Nice value corresponding to the priority value of a task of the interactive application, $\overline{U}_b$ represents the normalized average processor load for the tasks ($\tau_i$) of the background applications, $S_{back}$ represents a set of the tasks of the background applications, $\Sigma_{\forall \tau_i \in S_{back}} S_t(\tau_i)$ represents the sum of the time slices during which the resources of the processor are allotted to the tasks of the background applications for receiving service, $S_t(\tau_A)$ represents a time slice during which the resources of the processor are allotted to a task of the interactive application for receiving service, $\hat{U}_s$ represents the sum of processor loads for the tasks required for maintaining the system of the terminal device 100, and $U(\tau_A)$ represents the processor load for a task of the interactive application.

Here, the competition rate ($R_c(\tau_A)$) can be expressed by Formula 4 shown below.

$$R_c(\tau_A) = \min\left[\overline{U}_b n(S_{back})\left(\frac{1.25^{-v(\tau_A)} + \Sigma_{\forall \tau_i \in S_{back}} 1.25^{-v(\tau_i)}}{\Sigma_{\forall \tau_i \in S_{back}} 1.25^{-v(\tau_i)}}\right), 1\right] \quad \text{[Formula 4]}$$

Here, $n(S_{back})$ represents the number of tasks of the background applications in the terminal device 100, $v(\tau_A)$ represents the Nice value of a task of the interactive application, and $v(\tau_i)$ represents the Nice value of a task of a background application.

Also, $W(\tau_A)$ can be expressed by Formula 5 shown below.

$$W(\tau_A) = 1.25^{-v(\tau_A)} W_0 \quad \text{[Formula 5]}$$

Also, $S_t(\tau_A)$ can be expressed by Formula 6 shown below.

$$S_t(\tau_i) = pw(\tau_i)/\Sigma_{\forall \tau_j \in S} W(\tau_j) \quad \text{[Formula 6]}$$

Here, p represents the period of the CFS, and S represents a set of tasks present in the run-queue.

Also, $\overline{U}_b$ and $U(\tau_A)$ can be expressed by Formula 7 shown below.

$$\overline{U}_b = \Sigma_{\forall \tau_i \in S_{back}} U(\tau_i)/(100 n(S_{back}))$$

$$\hat{U}_s = \Sigma_{\forall \tau_i \in S_{sys}} U(\tau_i)/100 \quad \text{[Formula 7]}$$

The meanings of the first preemption delay time and second preemption delay time are described below.

Looking at the first preemption delay time, which occurs due to the tasks of background applications, an interactive application task may have a sleep time of $T_s(\tau_A)R_s(\tau_A)$ while receiving processing from the processor. During this sleep time, the tasks of the background applications may receive processing from the processor, where the time during which the tasks of the background applications receive processing can be calculated as $T_s(\tau_A)R_s(\tau_A)\overline{U}_b$.

As the tasks of the background applications receive processing from the processor, the virtual runtime of the background application tasks may increase, but the virtual runtime of the interactive application task may not increase, so that the interactive application task may exclusively utilize the resources of the processor for a duration tantamount to the difference in virtual runtimes, receiving processing continuously for a time of $T_s(\tau_A)R_s(\tau_A)\overline{U}_b W(\tau_A)/W_0$.

From the above, the time during which resources are occupied by background applications while the interactive application task is in the sleep time can be calculated as $T_s(\tau_A)R_c(\tau_A)\max[1-R_s(\tau_A)\overline{U}_b W(\tau_A)/W_0, 0]$.

Therefore, the first preemption delay time occurring due to tasks of background applications can be expressed as the product of the number of times the processing for the interactive application task is interrupted by another application $$\left( \frac{T_s(\tau_A)R_C(\tau_A)\max\left[1 - R_S(\tau_A)\frac{W(\tau_A)}{W_0}\overline{U}_b, 0\right]}{S_t(\tau_A)} \right)$$

and the time passed during one interruption ($\Sigma_{\forall \tau_i \in S_{back}} S_t(\tau_i)$).

Also, the second preemption delay time, which occurs due to tasks required for maintaining the system of the terminal device 100, is characterized by always being given priority, so that it can be expressed as the last equation shown in Formula 3.

Continuing on, the scheduling delay time ($L_s(\tau_A)$) represents the time passed from the first entry of the task into the run-queue until it is first serviced, and the waiting delay time ($T_w(\tau_A)$) represents the time passed from the dequeuing of a task when its service is completed until another task required for running an application is processed.

Since the scheduling delay time and the waiting delay time are not greatly affected by the frequency of the processor and the priority value (Nice value) of the interactive application, the sum of these two factors may be defined as a particular constant ($\delta = L_s(\tau_A) + T_w(\tau_A)$).

Continuing on, in step 220, the frequency determiner unit 120 may determine the frequency of the processor based on a default priority value (Nice value) such that the response time of the interactive application does not exceed a preset response time threshold (see Formula 8 below). Here, the default priority value (Nice value) can be the highest priority value (lowest Nice value).

$$R_t(\tau_A) = T_s(\tau_A) + L_p(\tau_A) + L_s(T_A) + T_w(\tau_A) \leq R_{th} \quad \text{[Formula 8]}$$

Here, $R_{th}$ represents the response time threshold.

That is, since the amount of power consumed by the terminal device 100 is proportional to the frequency of the processor, the power consumption of the terminal device 100 can be minimized by minimizing the frequency of the processor.

According to an embodiment of the invention, the frequency determiner unit 120 can determine the frequency based on at least one of a first processing amount ($\alpha(\tau_A)$) for tasks of the interactive application that are influenced by the frequency of the processor, a second processing amount ($\beta(\tau_A)$) for tasks of the interactive application that are not influenced by the frequency of the processor, a sum of processor loads ($\hat{U}_s$) for the tasks required for maintaining the system of the terminal device, a processor load ($U(\tau_A)$) for a task of the interactive application, the competition rate ($R_c(\tau_A)$) which represents the rate of competition with other tasks during processing for a task of the interactive application by the processor, a weight ($W(\tau_A)$) for a default priority value (default Nice value) of a task of the interactive application, an average processor load ($\overline{U}_b$) for the tasks of the background applications in the terminal device, a sum of time slices ($\Sigma_{\forall \tau_i \in S_{back}} S_t(\tau_i)$) during which the resources of the processor are allotted to the tasks of the background applications for receiving service, a time slice ($S_t(\tau_A)$) which is the time during which the resources of the processor are allotted to a task of the interactive application for receiving service, and the response time threshold ($R_{th}$).

More specifically, according to an embodiment of the invention, the frequency determiner unit 120 can determine the frequency based on Formula 9 shown below.

$$f_{opt} = \frac{\alpha(\tau_A)}{c/(a+b) - \beta(\tau_A)} \quad \text{[Formula 9]}$$

where $$a = 1 + \frac{\hat{U}_s}{U(\tau_A)/100}$$

$$b = \frac{R_c(\tau_A)\max\left[1 - R_S(\tau_A)\frac{W(\tau_A)}{W_0}\overline{U}_b, 0\right]\Sigma_{\forall \tau_i \in S_{back}} S_t(\tau_i)}{S_t(\tau_A)}$$

$$c = R_{th} - \delta$$

Since the values which the frequency of the processor can assume are typically discrete values and not continuous values, if the set of values that can be selected as the frequency of the processor is defined as $S_f$, the frequency determiner unit 120 can re-determine the frequency of the processor for running the interactive application to be the lowest frequency that is higher than the determined frequency from among the set ($S_f$) of discrete frequencies that the processor can use.

In short, the frequency determiner unit 120 can compute Formula 10 shown below based on Formula 8 described above, and can determine the optimum frequency by generating Formula 9 based on Formula 10.

Minimize: $f$

Subject to: $(a+b)T_s(\tau_A) \leq c$ $f \in S_f$ $v(\tau_A) = \min\{v(\tau_A) | v(\tau_A) \in S_v\}$ [Formula 10]

Next, in step 230, the priority value determiner unit 130 may determine the priority value, based on the frequency determined as above, such that the response time of the interactive application does not exceed the response time threshold.

That is, while a lower Nice value of the interactive application may result in a faster response time, the priority value may be increased, so that the background applications may receive relatively less service from the processor. In order to minimize such performance degradation of the background applications, the priority value of the interactive application may be determined to be the lowest value (highest value for the Nice value) within the extent of maintaining the response time threshold.

According to an embodiment of the invention, the priority value determiner unit 130 can determine the priority value based on at least one of the service time ($T_s(\tau_A)$) which represents the time during which the interactive application receives service from the processor, the competition rate ($R_c(\tau_A)$) which represents the rate of competition with other tasks during processing for a task of the interactive application by the processor, the number ($n(S_{back})$) of tasks of background applications in the terminal device, the sleep rate ($R_s(\tau_A)$) which represents the rate by which the state of a task of the interactive application in a kernel is a sleep state, an average processor load ($\overline{U}_b$) for the tasks of the background applications, the response time threshold ($R_{th}$), the sum of processor loads ($\hat{U}_s$) for tasks required for maintaining the system of the terminal device, and the processor load ($U(\tau_A)$) for a task of the interactive application.

More specifically, according to an embodiment of the invention, the priority value determiner unit 130 can determine the priority value based on Formula 11 shown below.

$$v_{opt} = -\log_{1.25}\{d/(de+g)\} \quad \text{[Formula 11]}$$

where $$d = T_s(\tau_A)R_c(\tau_A) \sum_{\tau_i \in S_{back}} 1.25^0 = T_s(\tau_A)R_c(\tau_A)n(S_{back})$$

$$e = R_s(\tau_A)\overline{U}_b$$

$$g = R_{th} - \delta - T_s(\tau_A)\left(1 + \frac{\hat{U}_s}{U(\tau_A)/100}\right)$$

Since the priority value of the interactive application, i.e. the Nice value, is an integer within the range of [−20, 19], it may not be suitable to determine the optimum value as the Nice value. Therefore, if the set of values that can be selected as a priority value is defined as the priority value determiner unit 130 can re-determine the priority value to be the highest priority value that is lower than the determined priority value from among the set of discrete values that the priority value can assume.

In short, the priority value determiner unit 130 can compute Formula 12 shown below based on Formula 8 described above, and can determine the optimum priority value by generating Formula 11 based on Formula 12.

$$\text{Maximize } v(\tau_A) \quad \text{[Formula 12]}$$

$$\text{Subject to: } d\left(\frac{1}{x} - e\right) \le g$$

$$f = f_{opt}$$

$$v(\tau_A) \in S_v$$

Here, $X = 1.25^{-v(\tau_A)}$.

Finally, in step 240, the executor unit 140 may run the interactive application based on the determined frequency and the determined priority value.

FIG. 3 illustrates pseudocode for a method of controlling a terminal device 100 according to an embodiment of the invention.

In short, a terminal device 100 according to an embodiment of the invention can provide excellent performance in terms of both power consumption and response time, compared with techniques such as the Ondemand Governor, HAPPE, etc., by applying a technique of adjusting the frequency of the processor and the priority value of the interactive application simultaneously. Also, whereas existing techniques cannot improve power consumption and response time at once, an embodiment of the invention provides the advantage of being able to minimize power consumption while satisfying the response time threshold based on a response time model.

A description is provided below, with reference to FIG. 4 through FIG. 9, on simulation results obtained for a terminal device 100 according to an embodiment of the invention.

FIG. 4 illustrates the results of comparing the validity of Formula 2 described above (for the service time) with tested values.

Referring to FIG. 4, processor stress applications that generate processor loads of 40% were executed as background applications, and it can be seen that the results of Formula 2 are similar to the tested values regardless of the number of background applications.

FIG. 5 through FIG. 7 compare the validity of Formula 3 (for the preemption delay time) with tested values.

Referring to FIG. 5 through FIG. 7, the results of Formula 3 were compared with test results for when the number of background applications is 0, 1, and 2, and it can be seen that the results of Formula 3 are similar to the tested values regardless of the number of background applications.

FIG. 8 and FIG. 9 compare the response time of an interactive application and the amount of power consumption when a smart device is controlled by the Ondemand Governor, HAPPE, and a control method according to an embodiment of the invention (marked as "RFP").

Although it was supposed that the threshold of response time differs for each user in the case of HAPPE, the tests were performed under the assumption that the desired extent is the same as the response time threshold (150 ms) set for the control method according to an embodiment of the invention.

Since the default value for the sampling rate is 50 ms for the Ondemand Governor and 1000 ms for HAPPE, the tests were conducted using these values, and to analyze the test results according to sampling rate, the results for 50 ms, 100 ms, 500 ms, and 1000 ms were obtained and compared with those of the other algorithms. Here, processor stress applications that generate processor loads of 40% were executed as background applications, the number of which is expressed as $n(S_{back})$, and the test were performed by varying the number.

FIG. 9 shows the test results for the response time of the interactive application. The Ondemand Governor exceeded the response time thresholds for all cases except when there were no background applications operating, while HAPPE did not satisfy the response time threshold when the number of background applications reached 2. With an embodiment of the present invention, however, it can be seen that the response time threshold is not exceeded regardless of the sampling rate even when there are two background applications operating. Compared with the Ondemand Governor, it may appear that the performance is lower when $n(S_{back})=0$, but this difference will not be actually perceivable to users, and by intentionally increasing the response time by an amount that is not perceivable to users, a large gain can be obtained in terms of power consumption instead. Compared with HAPPE, there is not much difference when $n(S_{back})=0$ and when $n(S_{back})=1$, because both algorithms optimize power consumption while keeping the response time at a level that does not cause discomfort to the user. When $n(S_{back})=2$, there is a greater gain in response time compared to HAPPE.

FIG. 8 shows the test results for the power consumption of the smart device.

With an embodiment of the invention, larger sampling rates may provide larger gains. To illustrate this point, the differences in values when the sampling rate is 50 ms and 1000 ms are 225.56 mW, 185.61 mW, and 70.62 mW respectively for the cases of $n(S_{back})=0$, $n(S_{back})=1$, and $n(S_{back})=2$, showing large differences. This is because a low sampling rate value can entail a relatively large overhead and can degrade performance.

Compared with the Ondemand Governor, larger values of the sampling rate can provide larger gains, but it can be seen that there are gains in power consumption for all sampling rates except when $n(S_{back})=0$.

Compared with HAPPE, the power consumption may be higher for the low sampling rates of 50 ins and 100 ms when $n(S_{back})=0$, but for 500 ms and 1000 ms, the performance is the same. This is because a low sampling rate value can entail a relatively large overhead, as described above. When n($S_{back}$)=1 and when n($S_{back}$)=2, there are always gains in power consumption regardless of the sampling rate.

Both HAPPE and an embodiment of the invention provide gains in power consumption, but the reason why the benefits are greater with an embodiment of the invention is because the Nice value of the interactive application is adjusted at the same time so as to provide changes in the response time. Such gains in response time can provide greater gains in power consumption.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

The invention claimed is:

1. A terminal device comprising:
a response time establisher circuit configured to establish a response time of an interactive application executed on the terminal device with a frequency of a processor within the terminal device and a priority value of the interactive application as variables;
a frequency determiner circuit configured to determine the frequency of the processor based on a default priority value such that the response time does not exceed a preset response time threshold;
a priority value determiner circuit configured to determine the priority value based on the determined frequency such that the response time does not exceed the response time threshold; and
an executor circuit configured to reducing a power consumption and reduce the response time of the device including the processor by running the interactive application based on the determined frequency and the determined priority value.

2. The terminal device of claim 1, wherein the response time of the interactive application comprises a service time and a preemption delay time, the service time being a function of the frequency of the processor, and the preemption delay time being a function of the priority value of the interactive application,
the service time represents a time during which the interactive application receives service by the processor,
and the preemption delay time represents a time during which resources of the processor are occupied by another task while a task of the interactive application is allotted with a required service time by the processor from a beginning to an end of running.

3. The terminal device of claim 1, wherein the frequency determiner circuit determines the frequency based on at least one of: a first processing amount of tasks of the interactive application that is influenced by the frequency of the processor, a second processing amount of tasks of the interactive application that is not influenced by the frequency of the processor, a sum of processor loads for tasks required for maintaining a system of the terminal device, a processor load for a task of the interactive application, a competition rate indicating a rate of competition with other tasks during processing for a task of the interactive application by the processor, a sleep rate indicating a rate by which a state of a task of the interactive application in a kernel is a sleep state, a weight for a default priority value of a task of the interactive application, an average processor load for tasks of background applications in the terminal device, a sum of time slices during which resources of the processor are allotted to the tasks of the background applications for receiving service, a time slice during which resources of the processor are allotted to a task of the interactive application for receiving service, and the response time threshold.

4. The terminal device of claim 3, wherein the frequency determiner circuit determines the frequency based on a formula shown below:

$$f_{opt} = \frac{\alpha(\tau_A)}{cl(a+b) - \beta(\tau_A)}$$

where $$a = 1 + \frac{\hat{U}_s}{U(\tau_A)/100}$$

$$b = \frac{R_c(\tau_A)\max\left[1 - R_s(\tau_A)\frac{W(\tau_A)}{W_0}\overline{U}_b, 0\right]\Sigma_{\forall \tau_i \in S_{back}} S_t(\tau_i)}{S_t(\tau_A)}$$

$$c = R_{th} - \delta$$

where $f_{opt}$ represents the determined frequency, $\alpha(\tau_A)$ represents the first processing amount, $\beta(\tau_A)$ represents the second processing amount, $\hat{U}_s$ represents the sum of processor loads for the tasks required for maintaining the system of the terminal device, $U(\tau_A)$ represents the processor load for a task of the interactive application, $R_c(\tau_A)$ represents the competition rate, $R_s(\tau_A)$ represents the sleep rate, $W(\tau_A)$ represents a weight for a Nice value corresponding to the default priority value of a task of the interactive application, $W_0$ represents a weight for a Nice value corresponding to a reference priority value, $\overline{U}_b$ represents the average processor load for the tasks ($\tau_i$) of the background applications in the terminal device, $S_{back}$ represents a set of the tasks of the background applications, $\Sigma_{\forall \tau_i \in S_{back}} S_t(\tau_i)$ represents the sum of the time slices during which the resources of the processor are allotted to the tasks of the background applications for receiving service, $S_t(\tau_A)$ represents the time slice during which the resources of the processor are allotted to a task of the interactive application for receiving service, $R_{th}$ represents the response time threshold, and $\delta$ represents a constant.

5. The terminal device of claim 1, wherein the frequency determiner circuit selects a lowest frequency that is higher than the determined frequency, from among a set of discrete frequencies available for the processor, and re-determines the selected lowest frequency as the frequency of the processor for running the interactive application.

6. The terminal device of claim 1, wherein the priority value determiner circuit determines the priority value based on at least one of: a service time indicating a time during which the interactive application receives service from the processor, a competition rate indicating a rate of competition with other tasks during processing for a task of the interactive application by the processor, a number of tasks of background applications in the terminal device, a sleep rate indicating a rate by which a state of a task of the interactive application in a kernel is a sleep state, an average processor load for the tasks of the background applications, the response time threshold, a sum of processor loads for tasks required for maintaining a system of the terminal device, and a processor load for a task of the interactive application.

7. The terminal device of claim 6, wherein the priority value determiner circuit determines the priority value based on a formula shown below:

$$v_{opt} = -\log_{1.25}\{d/(de+g)\}$$

where $$d = T_s(\tau_A)R_c(\tau_A)\sum_{\forall \tau_i \in S_{back}} 1.25^0 = T_s(\tau_A)R_c(\tau_A)n(S_{back})$$

$$e = R_s(\tau_A)\overline{U}_b$$

$$g = R_{th} - \delta - T_s(\tau_A)\left(1 + \frac{\hat{U}_s}{U(\tau_A)/100}\right)$$

$$T_s(\tau_A) = \frac{\alpha(\tau_A)}{f} + \beta(\tau_A)$$

where $v_{opt}$ represents a Nice value corresponding to the determined priority value, $T_s(\tau_A)$ represents the service time, $R_c(\tau_A)$ represents the competition rate, $\tau_i$ represents a task of the background applications, Sback represents the set of the tasks of the background applications, $n(S_{back})$ represents the number of tasks of the background applications, $R_s(\tau_A)$ represents the sleep rate, $\overline{U}_b$ represents the average processor load for the tasks $(\tau_i)$ of the background applications in the terminal device, $R_{th}$ represents the response time threshold, $\delta$ represents a constant, $\hat{U}_s$ represents the sum of processor loads for the tasks required for maintaining the system of the terminal device, $U(\tau_A)$ represents the processor load for a task $(\tau_A)$ of the interactive application, f represents the determined frequency, $\alpha(\tau_A)$ represents a first processing amount of tasks of the interactive application that is influenced by the frequency of the processor, and $\beta(\tau_A)$ represents a second processing amount of tasks of the interactive application that is not influenced by the frequency of the processor.

8. The terminal device of claim 7, wherein the priority value determiner circuit selects a highest priority value that is lower than the determined priority value, from among a set of discrete priority values available for the priority value, and re-determines the selected highest priority value as the priority value of the interactive application.

9. A computer-implemented method for controlling a terminal device, the method comprising:
establishing a response time of an interactive application executed on the terminal device with a frequency of a processor within the terminal device and a priority value of the interactive application as variables;
determining the frequency of the processor based on a default priority value such that the response time does not exceed a preset response time threshold;
determining the priority value based on the determined frequency such that the response time does not exceed the response time threshold; and
reducing a power consumption and reducing the response time of the device including the processor by running the interactive application based on the determined frequency and the determined priority value.

* * * * *